United States Patent [19]

Stanley et al.

[11] Patent Number: 4,635,251

[45] Date of Patent: Jan. 6, 1987

[54] MEET-ME CONFERENCE WITH CONTROL CAPABILITIES

[75] Inventors: Keith R. Stanley, Winfield, Ill.; David F. Winchell, Hollis, N.H.

[73] Assignee: AT&T Bell Laboratories, Murray Hill, N.J.

[21] Appl. No.: 761,068

[22] Filed: Jul. 31, 1985

[51] Int. Cl.⁴ ............ H04Q 11/04; H04M 3/00
[52] U.S. Cl. ........................ 370/62; 379/204
[58] Field of Search ............. 370/58, 62; 179/18 B, 179/18 BC

[56] References Cited

U.S. PATENT DOCUMENTS

3,144,518  8/1964  Lummis ..................... 179/18 BC
3,885,103  5/1975  Smith et al. ................. 370/62
4,305,149  12/1981 Harrison ...................... 370/62
4,317,960  3/1982  Johnson et al. ........... 179/18 BC
4,475,189  10/1984 Herr et al. .................... 370/62

Primary Examiner—Douglas W. Olms
Assistant Examiner—Wellington Chin
Attorney, Agent, or Firm—Richard J. Godlewski

[57] ABSTRACT

A communication network having a meet-me conference bridge is disclosed. The conference is accessed by each conferee dialing a code assigned to the bridge. A conference host is given a special code which accesses the same bridge but identifies the host as the controller who can add on other conferees and perform other special functions.

8 Claims, 6 Drawing Figures

MEET-ME CONFERENCE WITH CONTROL CAPABILITIES

TECHNICAL FIELD

This invention relates to communication systems and particularly to conference arrangements and method in which a plurality of customers establish a meet-me conference by simultaneously dialing an access code at a prearranged time.

BACKGROUND OF THE INVENTION

In a communication network, it is often desirable to provide conferencing service whereby a plurality of customers who are geographically separated can engage a conference bridge to exchange information. The information can be exchanged in the form of voice messages over telephone lines coupled to an audio bridge or the customers can exchange data via a data bridge. One such combined audio and data conference arrangement is disclosed in U.S. Pat. No. 4,475,189 issued to D. E. Herr, R. Metz, L. E. Suk, P. R. Wiley and D. F. Winchell on Oct. 2, 1984.

While the Herr et al. arrangement has proven commercial success, it is essentially a dial-up system whereby the conference host or originator seizes control of the conference bridge and summons each of the conferees by dialing a respective station address. Thus, where a large conference is to be established, the burden of dialing all the conferees is on the host of the conference.

Other arrangements known as "meet-me" conference arrangements are utilized by having each conferee dial the address of the conference bridge at a prearranged agreed upon time. One such conference arrangement is disclosed in U.S. Pat. No. 3,144,518 issued to B. D. Lummis on Aug. 11, 1964. In the Lummis patent, each leg of a conference is assigned to an individual terminal on a connector switch. By dialing the directory number assigned to the conference bridge, each conferee can establish a voice connection to a corresponding leg of the bridge.

While the Lummis and similar meet-me conference arrangements are suitable for their intended purpose, each conferee has equal status on the conference, i.e., there is no controller, and there are no special service provisions such as the ability to add on new conferees, etc.

SUMMARY OF THE INVENTION

The foregoing problem is solved and a technical advance is achieved by a conference arrangement and method for coupling customer stations to a conference bridge in response to a code received from each customer station. The conference arrangement is used in a communication network having a switch for interconnecting customer stations with the conference arrangement to form a conference. The conference arrangement includes a bridge having a plurality of ports each connectable to a corresponding one of the stations. In response to a first code from a calling station, a coupler included in the arrangement couples the calling station to the bridge. In response to a second access code from another station, the coupler couples the other station to the bridge and a receiver system. The receiver system is used to control the conference such as adding still other stations, transferring control to another station, etc.

In response to a request for conference service in one illustrative embodiment, a epecial access code for the conference host is assigned, and a separate code for the other conferees is assigned to access the conference bridge which provides the conference facilities. At a prearranged time, all the conferees except the conference host dial the code assigned to the conferees while the host dials the special access code. The equipment associated with the conference bridge responds to the special access code and couples the appropriate control equipment to the host's line. Thereafter, the host can actuate the control equipment to control the conference's special services, such as adding other conferees to the conference bridge in a dial-up mode, transferring control to another conferee, etc.

In accordance with one feature of the invention, the coupler includes a processor for ascertaining when the receiver system is coupled to any of the stations before coupling the receiver system to another station.

In accordance with another feature of the invention, the receiver system includes individual receivers to receive signals from the stations for transmittal to the coupler. In addition, the coupler includes a processor responsive to the signals received from the receiver system for causing a time-slot interchange to couple still other of the stations to the conference bridge.

In accordance with still another feature of the invention, the conference arrangement is a meet-me conference arrangement for establishing meet-me conferences.

In accordance with yet another feature of the invention, the method includes initiating a meet-me conference by each customer station transmitting a bridge location code and an access code and routing each customer station to the bridge identified by the bridge location code. The access code from each customer station is then transmitted to the identified bridge for coupling the station to the bridge when the access code is a conferee access code. When the access code is a host access code, the customer station is coupled to the bridge and to a receiver system for controlling the meet-me conference.

In accordance with still yet another feature of the invention, the method includes ascertaining when a plurality of host access codes have been transmitted and only coupling the receiver system to only one of the stations.

DETAILED DESCRIPTION

Figure 1:
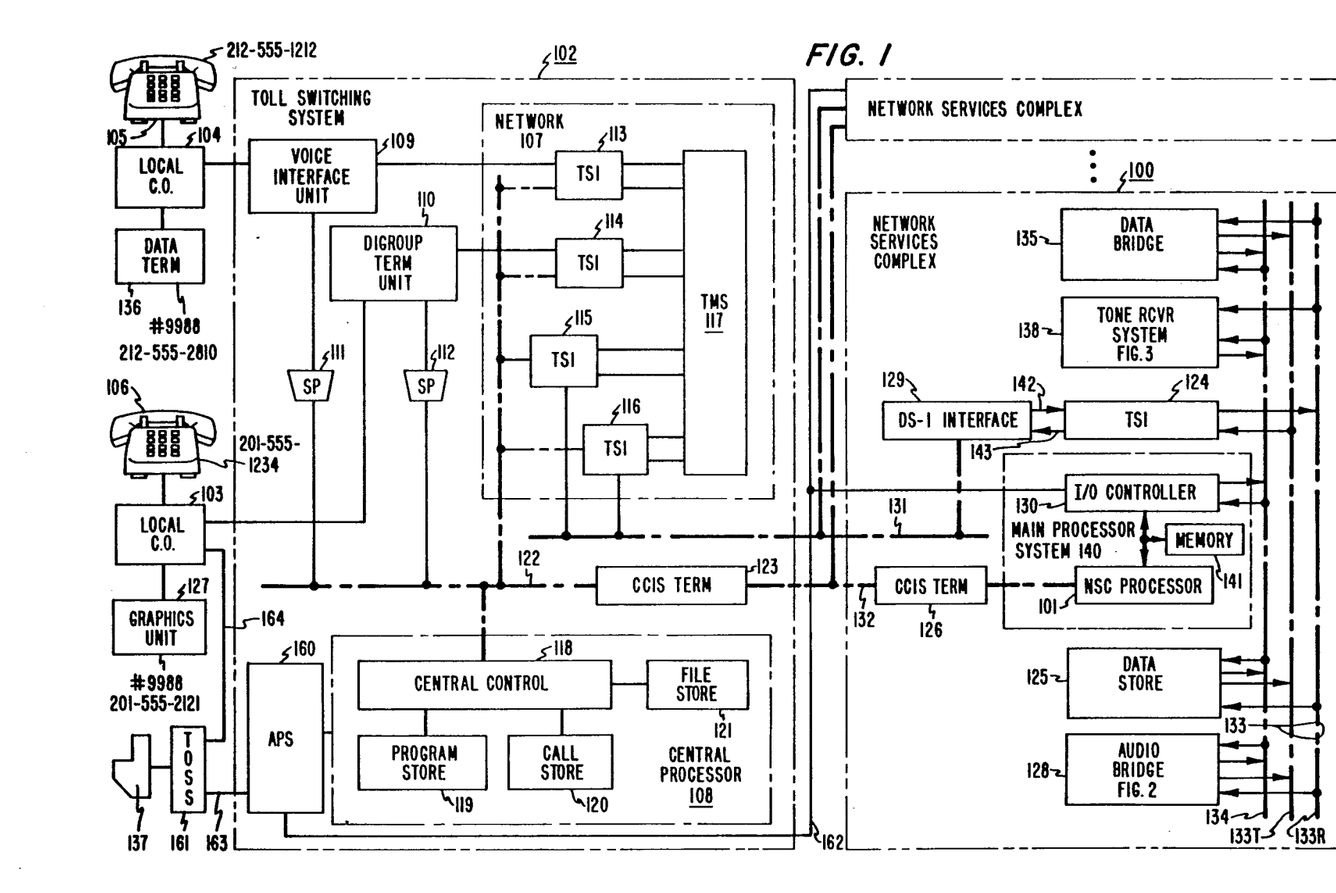
FIG. 1 is a block diagram of a telecommunications network having a switching system equipped with conferencing facilities.

The general organization of a system employing the invention is illustrated in the block diagram of FIG. 1 which shows a telecommunications network including a toll switching system 102 which serves local telephone central offices 103 and 104. Each of local offices 104 and 103 contains a switching system for providing telephone service to customer such as stations 105 and 106, respectively. Connected to system 102 and office 103 is teleconferencing operator support system 161 serving operator position 137. Also connected to switching system 102 is a plurality of network services complexes such as 100.

Figure 2:
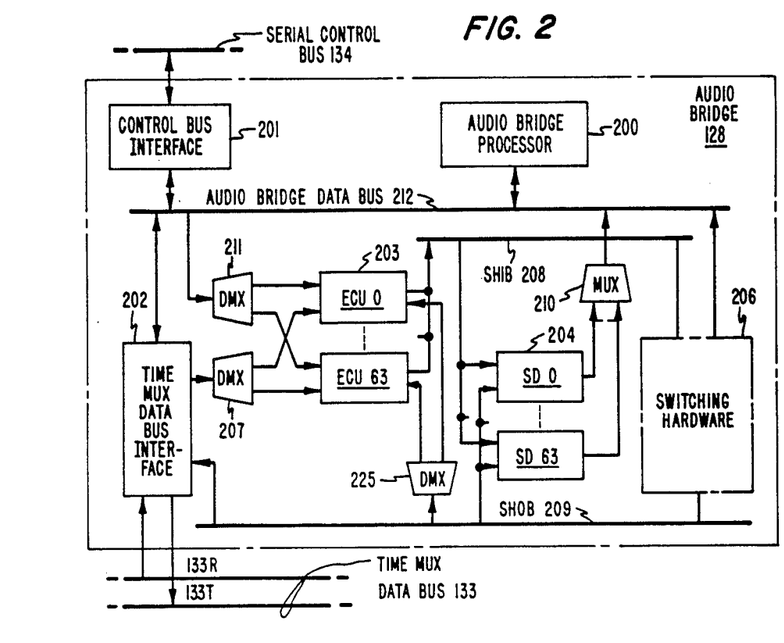
FIG. 2 is a detailed block diagram of a portion of the audio bridge of the conference facility.

Complex 100 includes a main processor system 140, data store system 125, audio bridge system 128 (also shown in FIG. 2), data bridge system 135, tone receiver system 138 (also shown in FIG. 3), and other units. As later described, one of the functions of complex 100 is to provide conferencing with announcements and instructions to customers over the telephone network via the toll switching system and local offices.

Toll system 102 is a typical switching system, such as the electronic switch described in detail in *The Bell System Technical Journal*, Vol. 56, No. 7, September 1977, and need not be fully described herein for the reader to understand the present invention.

System 102 comprises switching network 107, central processor 108, voice interface unit 109, digroup terminal unit 110, signal processors 111 and 112, attached processor system 160, and miscellaneous equipment units that have not been shown to simplify the drawing.

Network 107 has a time-space-time switching configuration utilizing time slot interchange (TSI) units 113-116, and time multiplexed switch (TMS) 117.

Access to network 107 is via serial pulse code modulation links each accommodating 120 voice channels. However, local offices 103 and 104 can be connected to toll system 102 via analog or digital transmission facilities. Thus, as seen in FIG. 1, local office 103 is connected to the toll system over digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also communicates signaling information to central processor 108 via signal processor 112.

The analog trunks are terminated in a voice interface unit such as 109 whose principal function is analog-to-digital conversion (and vice versa) plus formatting digital data for the TSI units. Voice interface unit 109 communicates with the central processor via signal processor 111.

Signal processor 111 provides the scan, distribution, and digit reception tasks for analog trunks, while signal processor 112 performs the equivalent tasks for the digital trunks except that instead of physical scan and distribution points, the supervisory states of each trunk are stored in a memory in the signal processor.

The majority of the logic, control, storage and translation functions required for the operation of the toll switching system are performed by central processor 108. A typical processor suitable for use in the illustrative toll switching system is described in *The Bell System Technical Journal*, Vol. 56, No. 2, February 1977.

Processor 108 includes central control 118 which is the information processing unit of the system and executes the program instructions resident in program store 119 using the call processing data in call store 120. Central control 118 communicates with the peripheral units via bus 122.

Switching system 102 is also equipped with an attached processor system 160 which directly interfaces with central processor 108 and the input/output controller in each network services complex served by the switching system. Among its many functions, attached processor system 160 performs certain maintenance and administrative tasks for switching system 102. In addition, the attached processor system provides a means for exchanging data between the teleconference operator support system 161 and the many network services complexes. A typical processor suitable for use as the attached processor system 160 is the 3B20 computer manufactured by AT&T Technologies, Inc. and described in the January 1983 issue of *The Bell System Technical Journal*, Vol. 62, No. 1, Part II.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in *The Bell System Technical Journal*, Vol. 57, No. 2, dated February 1978, and is represented herein by CCIS terminal blocks 123 and 126 and data link 132.

Coupled to the toll switching system are a plurality of conferencing systems, such as network services complex 100. Complex 100, which is typical of all complexes, comprises main processor system 140, data bridge system 135, audio bridge system 128, CCIS terminal 126, DS-1 interface 129, time slot interchange 124, data store system 125, and tone receiver system 138. The complex can also include other units such as additional conferencing bridges, speech recognition systems, data processing units, etc.

The network services complex is disclosed in U.S. Pat. No. 4,475,189 issued on Oct. 2, 1984 to D. E. Herr, R. Metz, L. E. Suk, P. R. Wiley, and D. F. Winchell, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other conference systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll system 102 and local office 103 as described above, and the data link 132 and its terminals are similar to those described in the 1978 *Bell System Technical Journal* cited above. Although these terminals are referred to as CCIS terminals, it is not essential that they be integrated in the CCIS signaling system used for call processing in the network. Complex 100 is also coupled to the teleconference operator support system 161 via attached processor system 160 and data links 162 and 163. It is via this data path that information can be exchanged between an operator at position 137 and the network services complex.

The network services complex is modularly designed to allow for various service units to be added. All units are interconnected over a data bus 133 and a control bus 134. The control bus is used by network services complex (NSC) processor 101 to communicate control, status, and error information with the various units in the complex. Program associated data, billing data, etc., which is distinguished from customer data to be conferenced, is also transmitted over control bus 134. Data bus 133, which conveys the customer data to be conferenced, consists of a transmit bus 133T and a receive bus 133R, and each bus is a 256 time slot, time-multiplexed PCM data bus.

Interface 129 connects the T1 trunks 131 from toll switching system 102 to time slot interchange unit 124 which, under the direction of processor 101, switches any time slot on T1 receive bus 142 or transmit bus 133T with any time slot on the T1 transmit bus 143 or receive bus 133R. Thus, the interface 129, time slot interchange 124, and bus 133 provide the path for the exchange of voice, conference data, announcements and inband signaling between the toll switching system 102 and units of the network services complex.

The network services complex 100 is controlled by a main processor system 140 which performs or initiates all call processing, maintenance, fault recovery, diagnostics, and audits for the entire complex. Included in main processor system 140 is processor 101 that interfaces with CCIS terminal 126 to transmit and receive messages from host toll switching system 102 and that communicates with teleconference operator support system 161 via I/O controller 130 over the previously described data path including links 162 and 163 and attached processor system 160.

As mentioned above, the network services complex can be equipped to furnish many services. For purposes of illustration, let it be assumed that the complex is equipped for meet-me conferencing with voice prompting. Accordingly, complex 100 comprises audio bridge system 128 which is used for combining the digital voice samples of speakers on a conference for distribution to other participants of the conference. Data bridge system 135, on the other hand, receives data from each conferee's data terminal such as 136 or graphics unit such as 127 and distributes the data to the other conferees at the correct speed, in the proper format, etc. The term, data, when used with respect to information transmitted by a customer, is meant to include digital representation of video signals, facsimile, signals from devices such as electronic chalk boards, etc., which is separate from the voice and tone signals transmitted by the customer.

Complex 100 also includes a data store system 125 for furnishing tones and announcements to instruct the customers in the use of the special services, and a tone receiver system 138 which receives the tone signals representing digits generated by the customer in controlling a conference.

The control interface between the network services complex system and the toll switching system 102 for call set-up is via a main processor system 140. It is via the main processor system that orders are exchanged between complex 100 and toll system 102 and between complex 100 and teleconference operator support system 161.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in network services complex. Thus, voice, customer data, and signaling information received from a conferee is forwarded via interface 129 and time slot interchange 124 to the audio and data bridges for conferencing or to tone receiver system 138 for digit detection and collection. Announcements and tones from data store system 125 and conference data from the bridges are transmitted to the conferees via the time slot interchange.

As noted above, meet-me conference calls are established by having all conferees dial access codes at a prearranged time in order to "meet" on a conference bridge. Prior to setting up the conference, the person originating the conference, i.e., the host, obtains the conference access codes. While the present arrangement is not limited to the specific manner in which the access codes are obtained, it will be appreciated that the user could dial a teleconferencing operator at position 137 who has access to the conference resources that are available and to a list of conference access codes that are used for accessing the conference systems. In the alternative, a customer could directly dial a facility such as the network services complex disclosed in the above cited Herr et al. patent, and the network services complex would be programmed to interact with the caller in allocating resources and announcing access codes for the meet-me conference systems to be used.

Let it be assumed that the teleconference operators support system 161 is being used as part of the meet-me conference reservation arrangement in this embodiment. Accordingly, the conference originator, i.e., the host, dials the toll free number associated with the conference reservation operator.

The call is routed via the host's local central office through toll system 102 to central office 103 serving teleconference operator support system 161 and operator position 137.

The conference host now requests the operator to reserve conference facilities for the impending conference. Since the conference system is designed to function on a national and international basis, the conference host requests a conference bridge that would be geographically located in a part of the country serving most of the conferees thus minimizing the length of the conferee legs to the bridge and the toll charges associated therewith.

In addition to the desired location of the bridge, the host must inform the operator of the size of the conference, the time and date the host desires the conference to take place, and the directory number to be billed for the use of the conference bridge. Each conferee, upon dialing his or her own connection to the meet-me bridge, will be billed only for toll charges incurred between his or her station and the bridge. The charges for the bridge and any ports reserved for adding on other conferees are billed to the host or to a third party as desired.

In response to receiving this information from the customer, the operator at position 137 interrogates the data base in teleconference operator support system 161 to ascertain what meet-me conference resources are available for this conference. If resources are available, the operator at position 137 enters the data associated with the conference in the data base. This data includes the conference identity, the bridge to be used, the number of legs reserved, the time the conference is to take place, and the access codes to be used by the parties to the conference.

In accordance with the invention, two access codes are provided for each meet-me conference. One access code, referred to herein as the conferee access code, would be used by all conferees except the host and enables each conferee to dial a connection directly to the bridge. The other access code, referred to as a host access code, is a special code to be used only by the host and causes the host to be connected to the bridge in a special manner.

Having obtained the access codes, the conference host informs all conferees of the code they should dial and the time the conference is to be held.

As noted above, the teleconference operator support system 161 comprises a data processor with a data base containing the parameters of the meet-me conference including the identity of the bridge, the number of ports and the time and date for which the bridge has been reserved. Just prior to the time the conference is to take place, the data processor in teleconference operator support system 161 transmits a series of messages via attached processor system 160 over the appropriate data links to complex 100. These messages will prime the network services complex with the pertinent data for the conference. Complex 100 stores this data in memory 141 of main processor system 140 in anticipation of receiving the first call from one of the conferees at the preassigned time.

At the time set aside for the conference, each conferee dials the conferee access code, and the host dials the special host access code. These access codes might take the form 700-NXX—XXXX. The initial three digits, 700, represent the universal code which may be used on a national basis to indicate meet-me teleconferencing service. The next three digits, NXX, indicate a particular bridge location. Since the conference system is designed to function on a national and international basis, it is desirable to select a bridging system which minimizes the length of the conferee legs. Thus, if the conferees are geographically located in one area of a country, a bridge could be assigned accordingly, so that the bridge would be centrally located to most of the conferees.

The last four digits of the access code indicate the assigned conference number and whether the caller is a conferee or the host, and might also be used to designate other criteria for the meet-me conference.

The NXX number dialed by a conferee or the conference host is translated by the local offices serving these parties to route the calls through the network to the proper toll switching center such as 102, which serves as the host switching center for the conference bridge that has been reserved. Switching system 102 and network services complex 100 process the call according to the sequence of operations about to be described with reference to FIGS. 4-6.

Figure 4:
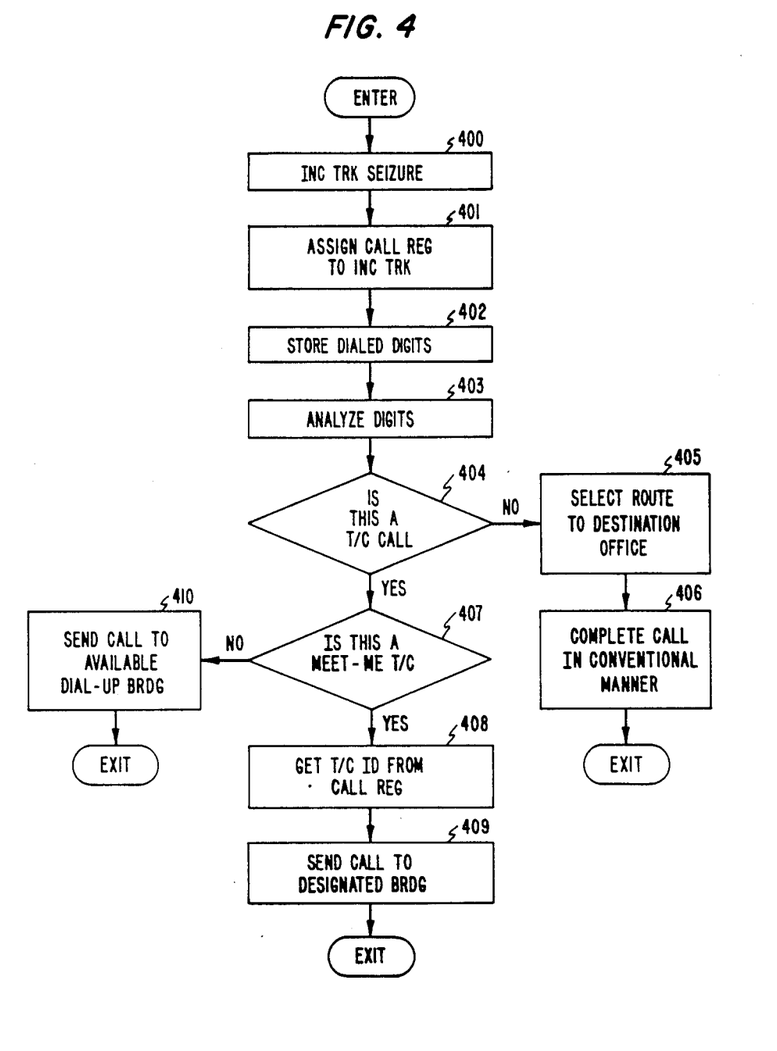
FIGS. 4–6 show flow diagrams depicting the sequence of operations in establishing a meet-me conference.

More specifically, upon recognizing the incoming trunk seizure as shown in box 400 of FIG. 4, central control 118 assigns a call register to the incoming trunk and begins collecting and storing in the call register the digits forwarded from the preceding switching office (boxes 401 and 402). A call register, which is a portion of call store memory 120, is assigned to each call and is used to store information relating to call processing.

When sufficient digits have been collected, the digits are analyzed by central control 118 to ascertain the routing of the call. This route translation function is well known to those skilled in the art and need not be described in detail herein. However, as the flow diagram of FIG. 4 indicates, central control 118 ascertains whether or not this is a teleconferencing call by analyzing the digits as shown in boxes 403 and 404. All calls other than meet-me conference calls are processed in a conventional manner by selecting a trunk to the appropriate destination office and forwarding the call over the trunk as described in boxes 405 and 406.

In the case of a conference call, central control 118 gets the teleconference identification from the call register by examining the digits stored therein. Using the digits which identify the conference, central control 118 searches a conference status table in call store 120 and forwards the call to the appropriate network services complex.

The network services complex is designed to handle both meet-me and dial-up teleconferences. However, the attendants served by the teleconference operator support system 161 only monitor those resources available for the reservation of a meet-me conference.

Accordingly, in the case of a meet-me conference central control 118 utilizes the teleconference bridge identification stored in the call register to route the call to the appropriate network services complex containing that bridge that has been reserved as shown in boxes 408 and 409 when the "yes" branch of decision box 407 is executed. On the other hand, if the "no" branch of box 407 is executed, indicating a dial-up conference is in progress, the call is sent to a network service complex having sufficient idle resources to handle the dial-up conference as shown in box 410.

Figure 5:
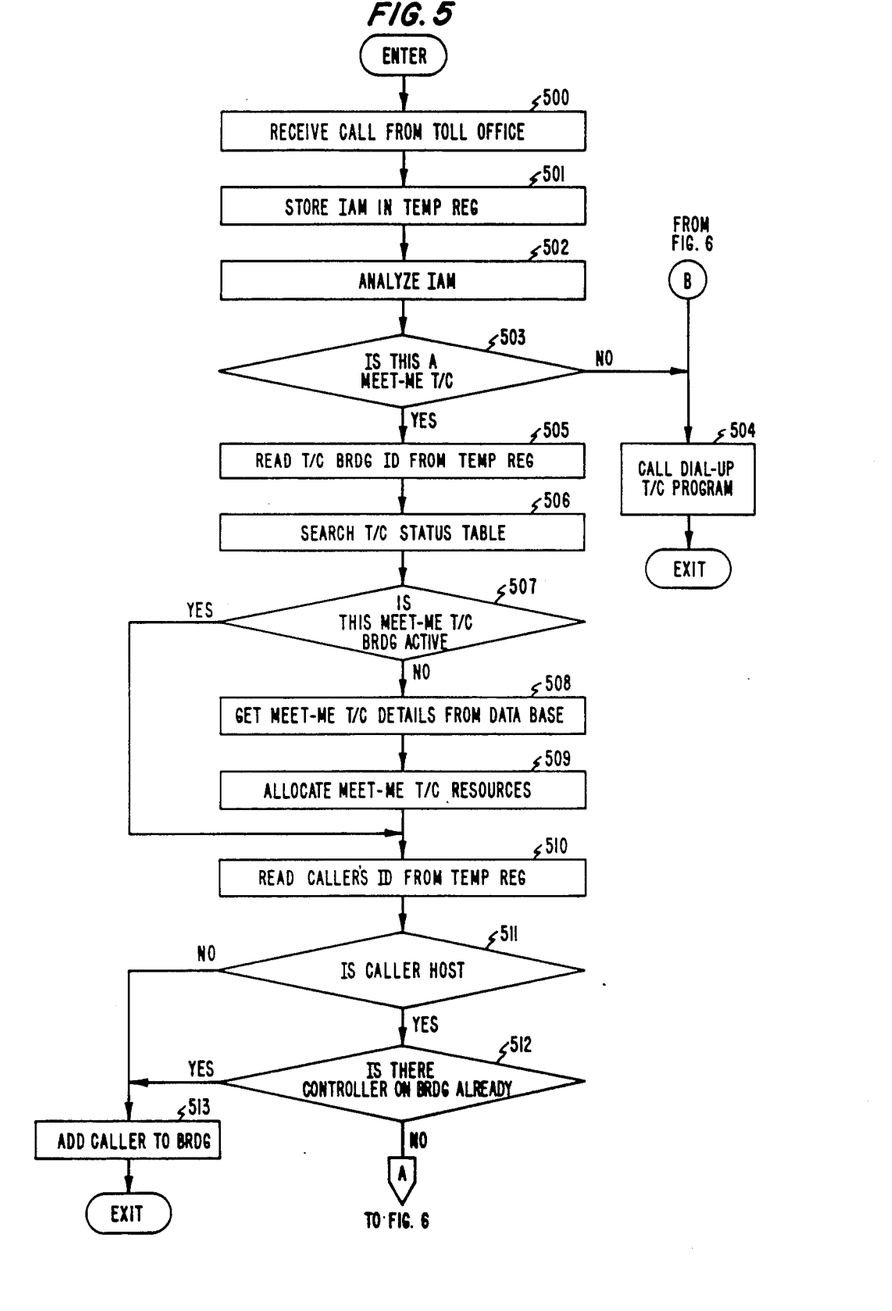

The call is forwarded from the toll switching system to complex 100 over data link 132 and CCIS terminal 126 in the form of an "initial address message" that is stored in a temporary register contained in main processor memory 141, as described in boxes 500 and 501 of FIG. 5. Network services complex processor 101 analyzes the "initial address message" to ascertain if this is a meet-me or dial-up teleconference as depicted in box 502. If it is a dial-up teleconference, the "no" branch of box 503 is executed and the dial-up teleconference program is called as described in box 504 and as set forth in detail in the aforementioned Herr et al. patent.

Since the call being described is a meet-me teleconference, the "yes" branch of decision box 503 is executed and processor 101 ascertains the teleconference bridge identification from the temporary register used to store the initial address message as depicted in box 505. Using the conference identification, processor 101 reads a conference status table in memory 141 (boxes 506 and 507) to ascertain the status of the conference, i.e., active or idle. Assuming that the call being processed is the first call to arrive at the network service complex for this conference, processor 101 must obtain the reservation data for the conference from a data base contained in data store 125.

As was noted above, the reservation data for the meet-me conference have been inserted in the data base of teleconference operator support system 161 by the operator at position 137. At the appropriate time just prior to the allotted time for the conference, the teleconference operator support system will transfer the reservation data to data store 125 via data links 162 and 163. If for some reason the reservation data has not been forwarded to the data store, processor 101 initiates a request over data link 162 and 163 via attached processor system 160 to have the reservation data forwarded. The reservation data may not have been forwarded prior to this due to many reasons, such as, trouble conditions, the conferee has requested the bridge facilities at a time other than the correct reserved time, etc.

Having obtained the conference reservation data (box 508), processor 101 begins allocating conference resources as set forth in box 509. For example, the audio bridge depicted in FIG. 2 and described in the Herr et al. patent comprises 64 conferee ports each having an echo canceling unit such as 203 and a speech detecting circuit such as 204. Processor 101 keeps a record of the busy/idle status of the ports in a port status table contained in memory 141 and assigns sufficient idle ports to accommodate the meet-me conference call being described.

Processor 101 now reads the caller's identification from the temporary register (box 510) and ascertains if the call is the host or one of the other conferees (box 511). It will be recalled form the prior discussion that the access code used by the host differs from the code used by all other conferees thus permitting the host to be given special control capabilities. If the access code dialed by the caller is a conferee access code, the conferee is added to the bridge as shown in box 513 and this portion of the program is exited.

Assuming that the code dialed by the caller in this instance is the host access code, the "yes" branch of decision box 511 is executed. Processor 101 now executes decision box 512 to ascertain if there is a host already on the bridge. The processor can ascertain this by examining the conference status table associated with this conference in memory 141.

If there is a host already on the bridge, it is assumed that the conferee placing this call has inadvertently dialed the host access code. In this case, processor 101 issues connect orders to time slot interchange 124 and audio bridge 128 to connect the present caller directly to the bridge as a regular conferee. This is indicated in the flowchart by the execution of the 37 yes" branch of box 512. Thus, main processor system 140 and time-slot interchange 124 is a coupling unit for coupling a calling conferee station to a bridge when a conferee access code is received from the calling station. When a host access code is received from the calling station, the coupling unit couples the calling station to the bridge and tone receiver system 138. The receiver system is effective when coupled to the calling station for controlling the operation of the conference such as adding or reconnecting conferees to the bridge, transferring control from the host to another conferee, etc.

Figure 6:
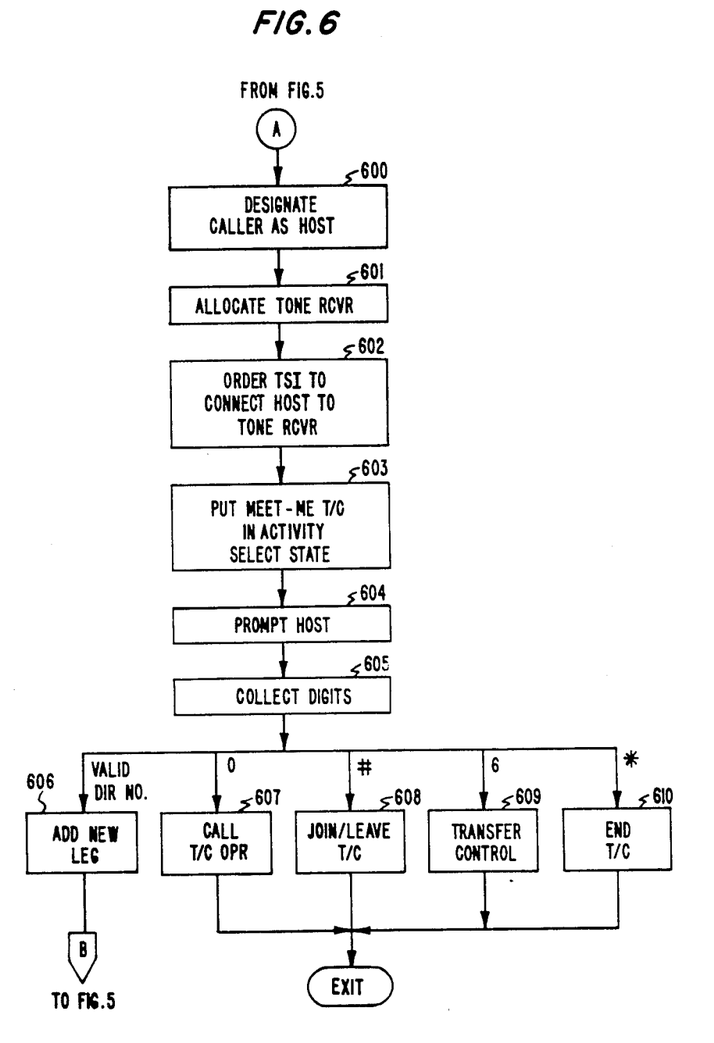

If this call is a call from the legitimate host and there is no other controller on the bridge, processor 101 assigns a port to the caller and marks the port status table with an indication that the caller is the host (box 600 of FIG. 6).

Having identified the caller as the host, processor 101 now consults the tone receiver status table in memory 141 to ascertain the availability of a tone receiver in tone receiver system 138.

Figure 3:
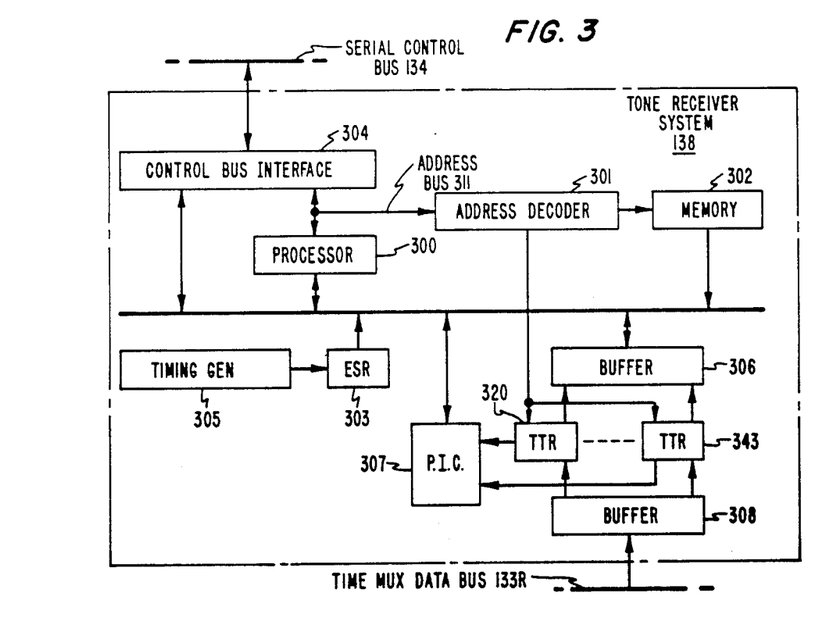
FIG. 3 is a detailed block diagram of a portion of the control equipment for the conference facility.

As shown in FIG. 3, tone receiver system 138 comprises a plurality of tone receivers 320-343, processor 300, address decoder 301, memory 302, bus interfaces 304 and 308, and other units of equipment.

Processor 300 is the main processor for the tone receiver system 138, and it decodes all orders received from NSC processor 101 over the serial control bus 134 via interface 304. In turn, processor 300 reports back to the NSC processor 101 the digits that had been received by tone receivers 320-343, error reports, etc. Processor 300 is also coupled to the NSC processor 101 via a single interrupt lead (not shown) which allows the tone receiver processor to interrupt the NSC processor to report digits received at designated intervals and to report those errors that occur in the tone receiver system.

A plurality of tone receivers 320-343 are provided in the tone receiver system 138. Each of the tone receivers is assigned a time slot on time multiplexed data bus 133R to receive digits from the telephone network in an 8-bit serial format. These digits are received from customer stations via time slot interchange 124 and the receive portion of time multiplexed data bus 133R and buffer 308. Each tone receiver comprises a digital signal processor which receives, detects, and reports to processor 300 the digits it receives. When a digit is received, the dual-tone multifrequencies are checked for validity within the tone receiver (320-343) and an interrupt is sent to processor 300 via priority interrupt controller 307. When processor 300 acknowledges the interrupt, it addresses the correct receiver in the group 320-343 via address decoder 301, and reads the contents of the receiver. Processor 300 then stores the digit along with the identity of the receiver in memory 302. In addition to checking the validity of the frequencies, the digital signal processor in each tone receiver assures that the dual-tone multifrequencies representative of a digit are present for a minimum interval.

A typical digital signal processor suitable for use in this invention is described in the *Bell System Technical Journal*, Vol. 6, No. 7, Part 2, September 1981.

In addition to providing digit storage capacity for tone receiver 320-343, memory 302 contains all operation and diagnostic programs, scratch pad registers, etc., for processor 300.

As noted above, processor 300 can transmit an interrupt signal to NSC processor 101 at periodic intervals to report errors and the digits received and stored in memory 302. Since memory 302 provides ample storage for the digits received by each tone receiver, the tone receiver system can be polled at intervals which are determined by processor 101 through the use of a program timer in the tone receiver system. This permits the NSC processor 101 to process calls more efficiently without having to constantly poll the tone receiver unit for each individual digit received.

In this conference arrangement being described, the conference is controlled from a host customer station through the use of a touch-tone keyset at that station in cooperation with the tone receiver at the network services complex. Processor 101 therefore reserves a tone receiver in receiver system 138 for future use by the host of the conference (box 601 of FIG. 6).

In particular, processor 101 selects an idle tone receiver such as 320 from the tone receiver status table and assigns the selected tone receiver to the conference by making the tone receiver entry busy. Processor 101 also sends an order over bus 134 to initialize the receiver. The initialization includes establishing the digit and interdigit timing intervals, the type of signaling, etc. Finally, processor 101 sends orders (box 602) over bus 134 to time-slot interchange 124 to couple the received tone receiver to the incoming trunk over which the host's call had arrived.

Processor 101 advances the conference to the "activity select" state by entering that state in the conference status table entry for this conference as shown in box 603, and an order is sent over bus 134 to data store 125 to cause the data store to play an announcement prompt to the host as shown in box 604. The announcement prompt sent via TSI 124 welcomes the host to the conference and informs the host of the control options that are available. Since a tone receiver has been connected to the incoming trunk serving the host, all digits dialed by the host are collected (box 605), and processor 101 will respond to these digits to call the conference control routines depicted in boxes 606–610. These conference control routines include adding another conferee by dialing the conferee's directory number, calling the teleconference operator, joining or leaving the conference, ending the conference or transferring control to another conferee such as described in the Herr et al. patent. In the latter case, processor 101 will issue orders to time slot interchange 124 to disconnect the tone receiver from the original host and reconnect it to the newly designated controller.

In summary, a meet-me conference arrangement has been described wherein facilities for controlling the conference are connected to the host conferee in response to the dialing of a special access code by the host, thus giving the host the ability to add on other conferees by dialing directory numbers or to perform other special control functions.

Of course, it will be understood that the arrangement described in the foregoing is merely illustrative of the application of the principles of the present invention. Numerous other arrangements may be utilized by those skilled in the art without departing from the spirit and scope of the invention.

What is claimed is:

1. For use in a communication network having a conference arrangement, a plurality of customer stations, and switching means for interconnecting said customer stations with said conference arrangement to form a conference, said conference arrangement comprising
    a conference bridge having a plurality of ports each being connectable to a corresponding one of said stations,
    receiver means effective when coupled to one of said stations for controlling said conference, and
    coupling means responsive to the receipt of a first code from a calling one of said stations for coupling said calling station to said bridge and responsive to the receipt of a second code from another of said stations for coupling said other station to said bridge and to said receiver means.

2. The arrangement of claim 1 wherein said coupling means comprises means for ascertaining if said receiver means is connected to any of said stations coupled to said bridge before connecting said receiver means to said other station.

3. The arrangement of claim 1 wherein said receiver means comprises means operable to receive signals from said other station for transmittal to said coupling means, and wherein said coupling means includes means responsive to signals from said receiver means for coupling still other of said stations to said bridge.

4. For use in a communication network having a meet-me conference arrangement, a plurality of customer stations, and switching means for interconnecting said customer stations with said conference arrangement to form a conference, said conference arrangement comprising
    a conference bridge having a plurality of conference ports each connectable to a corresponding one of said stations,
    receiver means effective when coupled to one of said stations for controlling said conference, and
    coupling means responsive to the receipt of a first code from a first calling one of said stations for coupling said first calling station to a first one of said ports independent of said receiver means and responsive to the receipt of a second code from a second calling one of said stations for coupling said second station to said receiver means and to a second one of said ports.

5. The arrangement of claim 4 wherein said receiver means comprises means operable to receive signals from said customer stations for transmittal to said coupling means, and wherein said coupling means includes means responsive to signals from said receiver means for coupling other ones of said stations to said bridge.

6. For use in a communication system having a conference arrangement, a plurality of customer stations, and switching means for interconnecting said customer stations with said conference arrangement to form a conference, said conference arrangement comprising
    a time-slot interchange connected to said switching means,
    a conference bridge having a plurality of ports each connected to said time-slot interchange;
    a signal receiver system having a plurality of signal receivers each connected to said time-slot interchange, and
    a processor connected to said switching means and operable for controlling said time-slot interchange,
    said processor responsive to a first code received from a first one of said customer stations for causing said time-slot interchange to interconnect said first one of said stations with one of said ports and responsive to a second code received from a second one of said stations for causing said time-slot interchange to interconnect said second one of said stations with one of said signal receivers and another of said ports, and
    said one of said signal receivers comprising means responsive to coded signals transmitted from said second customer station for signaling said processor to add other customer stations to said bridge.

7. For use in a communication network having a plurality of conference bridges, a plurality of customer stations, and switching means for interconnecting said stations with said bridges to form a conference, a method for providing customer control of a meet-me conference comprising the steps of:
    initiating meet-me conference calls from said customer stations by transmitting from each customer station a bridge location code and an access code,
    routing the calls to the bridge identified by the bridge location code,
    transmitting the access code to the identified bridge,
    identifying the access code transmitted for each call routed to the bridge,
    detecting when a host access code is received from a station for coupling the station to the bridge and to receiver apparatus for controlling the conference, and
    detecting when a conferee access code is received from other ones of said stations for coupling said other stations to the bridge independent of said receiver apparatus.

8. The method of claim 7 wherein the step of detecting when a host access code is received comprises the step of ascertaining when certain of said stations have each transmitted the host access code and connecting the receiver apparatus to only one of said certain stations transmitting the host access code.

* * * * *